Figure 2:
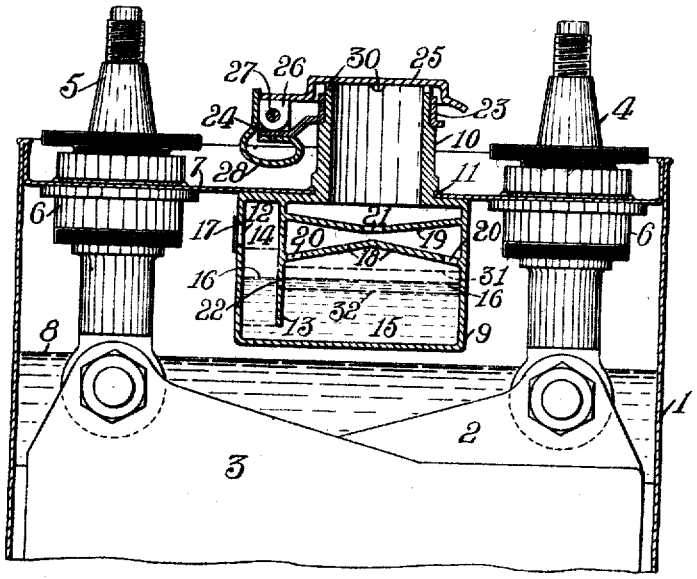

M. R. HUTCHISON.
SAFETY DEVICE.
APPLICATION FILED MAR. 28, 1914.

1,130,977.

Patented Mar. 9, 1915.

Witnesses:

Inventor:
Miller Reese Hutchison
by Dyer & Holden
his Attys.

UNITED STATES PATENT OFFICE.

MILLER REESE HUTCHISON, OF WEST ORANGE, NEW JERSEY, ASSIGNOR TO EDISON STORAGE BATTERY COMPANY, OF WEST ORANGE, NEW JERSEY, A CORPORATION OF NEW JERSEY.

SAFETY DEVICE.

1,130,977. Specification of Letters Patent. Patented Mar. 9, 1915.

Application filed March 28, 1914. Serial No. 827,784.

*To all whom it may concern:*

Be it known that I, MILLER REESE HUTCHISON, a citizen of the United States, and a resident of Llewellyn Park, West Orange, Essex county, New Jersey, have invented certain new and useful Safety Devices, of which the following is a description.

My invention relates to safety devices and more particularly to safety devices for secondary cells or batteries, being in some respects an improvement on the invention disclosed in Patent No. 1,116,893 granted to me on November 10, 1914, and entitled Safety devices for secondary cells.

In safety devices for storage batteries of the type disclosed in my patent referred to, gases evolved from the electrolyte of a battery are caused to pass to the outside of the battery through a body of liquid contained in a vessel, which vessel communicates both with the interior of the battery container and with the outside atmosphere. This vessel has communication with the outside atmosphere above the level of the liquid therein, while communication is established between such vessel and the interior of the battery can or container, above the level of the electrolyte therein, either by means of an open ended pipe or tube, one end of which communicates directly with the space above the electrolyte in the battery container, while the other end thereof is disposed within the vessel below the level of the liquid therein and a short distance from the bottom thereof, or by means of an opening or openings through the outer side wall of the vessel and above the level of the liquid therein. In the latter case the liquid-containing vessel is mounted within the battery can above the surface of the electrolyte and below the top of the can and is provided with a flange or sleeve disposed inside thereof and extending downwardly from above the level of the liquid to within a short distance of the bottom of the vessel, which flange, in effect, divides the vessel into two liquid containing chambers which communicate adjacent the bottom of the vessel. Communication is established with the outside of the can, in the construction just described, by suitable means such as a neck extending from the top of the vessel and through the top of the battery can. By experimentation I have found, however, that a safety device such as described above when applied to a storage battery has several objectionable features. When the battery is charged or overcharged at a high rate the electrolyte decomposes rapidly, and gives off gases in such quantities that a foam consisting of a mass of bubbles forms on the top of the electrolyte. These bubbles will, under the conditions mentioned, flow out through the liquid of the safety device in a substantially continuous stream and form in effect a direct path of flame communication through such liquid from the inside to the outside of the cell and vice versa. Moreover, the escape of these bubbles from the battery or cell results in the deposit on the outside of the cell of sulfuric acid in the case of lead cells and caustic potash in the case of cells of the nickel-iron type, with the consequent disadvantages and dangers set forth in my above mentioned patent. Also, should an explosion take place in the cell or battery, it is very apt to propel or shoot the liquid out of the liquid-containing vessel of the safety device, to the outside of the cell. Furthermore, during the charging or discharging of the cell heat is generated therein, resulting in the expansion of the gas or gases above the electrolyte. Upon discontinuing the charging or discharging of the cell the latter will cool down and the gas or gases above the electrolyte will accordingly contract and thereby a partial vacuum within the cell will be created. The pressure of the atmosphere outside the battery or cell will then act to force the liquid from the liquid-containing vessel of the safety device and discharge the same into the electrolyte in the battery can, and accordingly the safeguard, intended to be provided by the safety device, is apt to be removed when most needed.

The principal object of the present invention is to provide an improved and simple safety device for storage batteries which will obviate these objectionable features, Other objects and features of my invention will be hereinafter more fully described and claimed.

In order that my invention may be more clearly understood, attention is directed to the accompanying drawing, forming a part of this specification, in which is illustrated a preferred embodiment of my invention, and in which—

Figure 1:
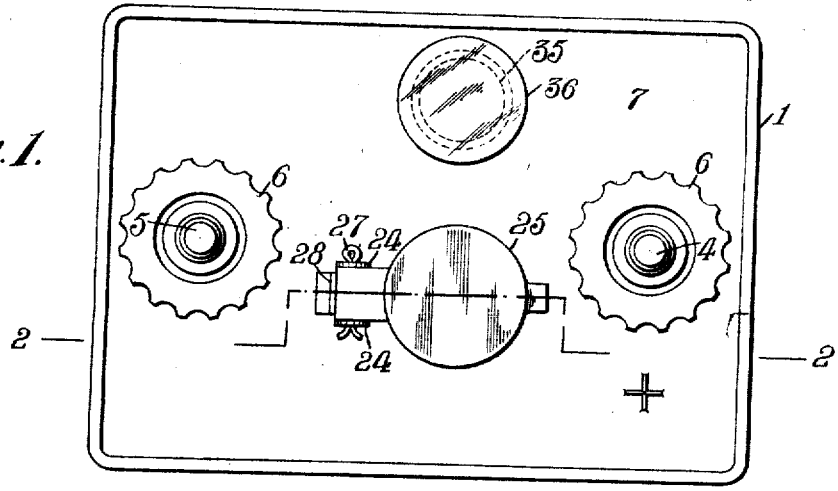

Figure 1 is a top plan view of an Edison cell equipped with my invention; and Fig. 2 is a vertical sectional view thereof taken on line 2—2 of Fig. 1, the lower portion of the cell being broken away.

In the drawings, reference character 1 indicates the battery can or container of an Edison storage battery within which are disposed the plates or grids 2 and 3 mounted and insulated from each other in the usual manner and connected, all of the plates of one polarity with the terminal 4 and all the plates of the other polarity with the terminal 5. The terminals 4 and 5 extend through suitable bushings 6, in the top 7, of the container 1, to the outside of the container. The electrolyte within the container is represented by reference character 8.

My improved safety device comprises a liquid-containing receptacle or vessel 9 which is preferably mounted within the container 1, below the top 7 thereof and above the surface of the electrolyte. The vessel 9 is provided with a neck 10 which extends above the top 7 of the battery can 1 through an opening therein. This opening is formed with a beaded edge 11 which is forced into a groove or recess formed at the junction of the neck 10 and the top of the vessel 9, whereby the latter is supported by the top 7 with the latter and the top of the vessel snugly in contact, and whereby a tight joint is formed between the top 7 and the vessel 9. In the side wall of the vessel 9, near the top thereof, I provide an opening 12, whereby communication between the space in the container above the level of the electrolyte and the interior of the vessel is established.

Reference character 13 represents a vertical partition which depends from the top of vessel 9 between the neck 10 and that portion of the side wall of the vessel provided with opening 12 and terminates a short distance from the bottom thereof, whereby the vessel 9 is divided into two chambers or compartments 14 and 15 which communicate below the partition. The receptacle or vessel 9 contains sufficient liquid, such as water or caustic potash solution, so that the surface thereof in compartments 14 and 15 is normally at the level indicated by reference character 16, this level being somewhat below the opening 12 and a considerable distance above the bottom of the partition 13. The opening 12 communicates with the upper portion of compartment 14 and the neck 10 with the upper portion of compartment 15. It will be apparent that the liquid in the vessel 9 forms a seal and that any gas escaping from the container 1 must pass through this liquid.

When the gas formed with the cell has sufficient pressure to overcome the head of liquid in vessel 9, represented by the distance partition 13 extends into the liquid, this gas will force the liquid in compartment 14 down to the lower edge of partition 13 and cause it to rise in compartment 15 to the level indicated by the dotted line 31. The gas will then pass under the partition and up through the liquid in compartment 15 and through the outlet or neck 10 to the outside of the cell.

I provide suitable means for breaking all bubbles of gas evolved from the electrolyte 8 before the same reach the liquid in vessel 9. This means preferably comprises a member of foraminous material, such as a piece of gauze 17, suitably secured to vessel 9 and covering the opening 12 therein. Moreover, if an explosion takes places within the cell, the flame is stopped at the opening 12 by the gauze, the action thereof being similar to the gauze covering the flame in the well known Davy's lamp.

In order to prevent the expulsion of the liquid in the vessel 9 out through the neck 10 when an explosion takes place in the cell, I preferably provide baffle plates 18 and 19 in the compartment 15, which plates are disposed above the liquid therein and preferably just below the neck 10 and are provided with non-registering openings 20 and 21. The openings 20 in the lower plate 18 may be several in number and are preferably disposed adjacent the edge thereof; but the upper plate 19 preferably has but a single centrally located opening 21. The lower plate 18 preferably has the shape of a flat cone or pyramid and the upper plate is preferably in the shape of an inverted flat cone or pyramid. The two plates, therefore, approach each other at their centers, and form, in effect, a tortuous passage between that part of chamber 15 just above the normal level of the liquid therein and the outlet or neck 10, and as this passage contracts toward the opening 21 it will act to restrict the flow of gases therethrough from the cell. Accordingly, the liquid in the vessel 9 will not be forced out through the neck 10 when an explosion takes place in the cell. The plates 18 and 19 also form an additional safeguard against the propagation of flame to the outside of the cell. If any bubbles should get past the gauze 17 and through the liquid in chamber 15, they will be burst in going through the holes 20 and 21, and if any ignited gases from the interior of the cell should get as far as the baffle plates, the latter would tend to absorb heat enough from the gases to cool them down below the ignition point before they reach the outlet or neck 10 of the vessel 9. Moreover, plates 18 and 19 also obstruct, to a considerable degree, the propagation of flame to the inside of the cell from the outside thereof.

My invention also comprises another feature which greatly adds to its practical value. When the cell is charged or discharged, heat is generated therein. When the cell afterward cools down the gas in the cell above the electrolyte contracts and its pressure falls, creating a partial vacuum. The atmosphere now acts on the liquid in the vessel 9, and forces it down in the compartment 15 and up in the compartment 14. Hence the liquid in the vessel 9 would ordinarily be forced into the container 1 through the opening 12. To prevent this, the partition 13 is provided with a very small hole 22 just below the normal lever 16 of the liquid. Now when the atmosphere forces the water down in the compartment 15, toward the level indicated by dotted line 32, and up in the compartment 14, the opening 22 will be uncovered by the liquid in the former compartment before it reaches the opening 12 in the latter. Air can now pass through the opening 22 from the compartment 15 into the compartment 14 and thence through opening 12 into the space above the electrolyte in container 1, and the partial vacuum in the latter is thereby destroyed. Accordingly, the liquid in the vessel 9, will not be depleted. When the cell is gassing, and the level of the liquid in the vessel 9 has been forced below the level of opening 22 in the compartment 14, some gas may pass through the hole 22 into the compartment 15, but the quantity of this gas will be small and it will have to go through a certain depth of the liquid before it reaches the outlet or neck 10. Also, some of the liquid may trickle from the compartment 15 through the hole 22 down to the liquid in the compartment 14 at this time, but the quantity thereof will be negligible and not sufficient to restore the liquid in the two compartments to the same level. Hence the presence of the hole 22 does not interfere with the successful operation of my improved safety device. The neck 10 is preferably provided with a counterbalanced, preferably spring-pressed, cap or cover. As shown, the neck has a reduced outer end portion to which is suitably secured a ring 23. This ring has a lateral extension provided with upturned lugs 24.

Reference character 25 represents the cap or cover which is provided with an extension having a lug 26 received between the lugs 24 and pivoted thereto by a pin 27. A spring 28 is secured to the extension of ring 23 and is formed with a loop, the free end of the spring pressing against the rear edge of lug 26 when the cap is closed, the effect of the spring being to hold the cap or cover in that position. When the cap is opened, the free end of the spring 28 slides around the extension provided on the cap 25 and presses against the top thereof to hold the cap in open position. The outer edge of the neck 10 is provided with recesses or notches 30 to allow air to flow freely into the vessel 9 when the cap is closed. The cap 25 will be thrown open by the force of an explosion within the cell, and thereby serve as an indicator of the fact of the explosion.

The top 7 of the container or can 1 is preferably provided with a filling opening 35, which is normally closed by a cap 36. The cell may be replenished with electrolyte both through the filling opening 35 and the vessel 9. The removal of cap 36 permits gas to escape from the cell through the filling opening and thereby the passage of electrolyte through the vessel 9, to the interior of the container 1. In its passage through vessel 9, the fresh electrolyte will act to wash the potash or other materials deposited therein back into the cell.

From the above description it will be apparent that I have provided a safety device adapted to act as such under all conditions that have to be reckoned with in storage battery practice: An explosion cannot be propagated through the safety device, either from the inside of the cell or from without; an explosion within the cell cannot expel the liquid from the safety device; and the pressure of the atmosphere is prevented from forcing the liquid of the safety device into the battery can or container upon the gradual decrease of the pressure within the cell as the same cools down.

While I have shown and described my improved safety device as applied to a storage battery, it is evident that the same is adapted for general use with sealed containers containing explosive or combustible materials to control the escape of gases therefrom. The description and drawing are illustrative only, and it is to be understood that my invention is not restricted to the single embodiment disclosed herein, but that many changes in the shape, size and arrangement of the parts thereof may be made without any departure from the spirit and scope of my invention.

Having now described my invention, what I claim as new and desire to protect by Letters Patent is as follows:—

1. The combination with a battery cell, of a fluid-containing vessel, said vessel having connections with said cell which cause gases which escape from said cell to pass through the fluid in said vessel, and means for preventing the expulsion of the fluid from said vessel by an explosion within said cell, substantially as described.

2. The combination with a receptacle, of a fluid-containing vessel having connections with said receptacle which cause gases escaping from said receptacle to pass through the fluid in said vessel, said vessel being provided with means for preventing depletion of the fluid therein when the pressure within said receptacle falls below the pressure outside thereof, substantially as described.

3. A safety device for storage batteries and the like, comprising a fluid-containing vessel having an inlet and an outlet above the normal level of the fluid therein, and means whereby gas passing from the inlet to the outlet is caused to pass through said fluid, said vessel being provided with means for preventing the depletion of the fluid therein when the pressure at the outlet exceeds that at the inlet, substantially as described.

4. A safety device for storage batteries and the like, comprising a fluid-containing vessel having an inlet and an outlet above the normal level of the fluid therein and a vertical partition extending into said fluid and disposed between said inlet and outlet, said partition terminating above the bottom of said vessel and being provided with a small opening below the normal level of the fluid, substantially as described.

5. In a storage battery, the combination with the container thereof, of a fluid-containing vessel supported by said container and communicating with the outside thereof, said vessel having an opening above the level of the liquid therein to establish communication with the interior of said container, and foraminous means disposed over said opening, substantially as described.

6. A safety device for storage batteries and the like, comprising a fluid-containing vessel having a pair of compartments communicating adjacent the bottom of the vessel, one of said compartments being provided with an inlet and the other of said compartments being provided with an outlet, said inlet and outlet both being above the normal level of the fluid in said vessel, and means for preventing fluid from being expelled from said vessel through said outlet upon the sudden application of pressure to the fluid through said inlet, substantially as described.

7. A safety device for storage batteries and the like, comprising a fluid-containing vessel having an inlet and an outlet above the normal level of the fluid therein and means whereby gas passing from the inlet to the outlet is caused to pass through said fluid, and means for preventing the fluid from being expelled from said vessel through the outlet upon the sudden application of pressure to the inlet, substantially as described.

8. A safety device for storage batteries and the like, comprising a fluid-containing vessel having a pair of compartments communicating adjacent the bottom of the vessel, one of said compartments being provided with an inlet and the other of said compartments being provided with an outlet, said inlet opening into said vessel above the normal level of the fluid therein, and means in said last compartment providing a tortuous contracting passage therein between the normal level of the fluid and the outlet, substantially as described.

9. A safety device for storage batteries and the like, comprising a fluid-containing vessel having a pair of compartments communicating adjacent the bottom of the vessel, one of said compartments being provided with an inlet and the other of said compartments being provided with an outlet, said inlet and outlet both being above the normal level of the fluid in said vessel, and a plurality of baffle plates in said last compartment between the normal level of the fluid and the outlet, said plates being provided with non-registering apertures, substantially as described.

10. A safety device for storage batteries and the like, comprising a fluid-containing vessel having a pair of compartments communicating adjacent the bottom of the vessel, one of said compartments being provided with an inlet and the other of said compartments being provided with an outlet, said inlet and outlet both being above the normal level of the fluid in said vessel, and a pair of plates in said last compartment between the normal level of the fluid and the outlet, said plates having non-registering apertures and converging to form a passage for the flow of gas to said outlet which contracts in the direction of such flow, substantially as described.

11. In a storage battery, the combination with the container thereof, of a fluid-containing vessel having an outlet to the outside of said container and having connections with the latter which cause gas escaping from the container to pass to said outlet through the fluid in said vessel, the latter being provided with a plurality of baffle plates above the normal level of said fluid, substantially as described.

12. In a storage battery, the combination with the container thereof, of a fluid-containing vessel having an outlet to the outside of said container and having connections with the latter which cause gas escaping from the container to pass to said outlet through the fluid in said vessel, the latter being provided with a plurality of baffle plates above the normal level of said fluid, said baffle plates having non-registering openings, substantially as described.

13. In a storage battery, the combination with the container thereof, of a fluid-containing vessel supported by said container, a partition extending downwardly from the top of the vessel and terminating short of the bottom thereof, said vessel having an inlet on one side of said partition leading from the container, and an outlet on the other side of the partition leading to the outside of the vessel, foraminous means over said inlet, and a plurality of baffle plates between the normal level of the fluid in the vessel and said outlet, said partition having an opening therethrough below the normal level of said fluid, substantially as described.

This specification signed and witnessed this 26th day of March 1914.

MILLER REESE HUTCHISON.

Witnesses:
 WILLIAM A. HARDY,
 MARY J. LAIDLAW.

It is hereby certified that in Letters Patent No. 1,130,977, granted March 9, 1915, upon the application of Miller Reese Hutchison, of West Orange, New Jersey, for an improvement in "Safety Devices," errors appear in the printed specification requiring correction as follows: Page 2, line 90, for the word "places" read *place;* page 3, line 21, for the word "lever" read *level;* and that the said Letters Patent should be read with these corrections therein that the same may conform to the record of the case in the Patent Office.

Signed and sealed this 30th day of March, A. D., 1915.

[SEAL.]

J. T. NEWTON,
*Acting Commissioner of Patents.*